US005590154A

United States Patent [19]
Forni et al.

[11] Patent Number: 5,590,154
[45] Date of Patent: Dec. 31, 1996

[54] EQUALIZER CIRCUIT AND A METHOD FOR EQUALIZING A CONTINUOUS SIGNAL

[75] Inventors: William R. Forni, Chandler; Scott A. Kaylor, Gilbert, both of Ariz.

[73] Assignee: Motorola, Inc., Schaumburg, Ill.

[21] Appl. No.: 494,424

[22] Filed: Jun. 26, 1995

[51] Int. Cl.$^6$ .................................................. H03D 3/22
[52] U.S. Cl. .................. 375/229; 375/230; 375/232; 364/724.01; 364/724.19; 364/724.2; 333/28 R
[58] Field of Search ...................................... 375/229, 230, 375/232, 234; 364/724.01, 724.08, 724.16, 724.17, 724.19, 724.2; 333/18, 28 R

[56] References Cited

U.S. PATENT DOCUMENTS

| | | | |
|---|---|---|---|
| 3,553,606 | 4/1969 | Port | 333/28 R |
| 3,758,863 | 9/1973 | Ungerboeck | 375/229 |
| 4,290,139 | 9/1981 | Walsh | 333/18 |
| 4,809,209 | 2/1989 | White . | |
| 4,872,184 | 10/1989 | Yamaguchi et al. | 364/724.2 |
| 5,233,549 | 8/1993 | Chinn . | |
| 5,243,624 | 9/1993 | Paik et al. . | |
| 5,268,848 | 12/1993 | Coker et al. . | |
| 5,327,459 | 7/1994 | Hara et al. | 375/232 |
| 5,341,249 | 8/1994 | Abbott et al. . | |
| 5,345,342 | 9/1994 | Abbott et al. . | |
| 5,359,628 | 10/1994 | Muto | 364/724.2 |
| 5,377,226 | 12/1994 | Davis . | |
| 5,381,359 | 1/1995 | Abbott et al. . | |
| 5,400,394 | 3/1995 | Raman et al. . | |
| 5,517,524 | 5/1996 | Sato | 375/230 |
| 5,524,126 | 6/1996 | Clewer et al. | 375/355 |

OTHER PUBLICATIONS

S. U. H. Qureshi, "Adaptive Equalization", Proceedings of the IEEE, vol. 73, No. 9, Sep. 1985, pp. 1349–1387.
R. W. Lucky, "Automatic Equalization for Digital Communication", The Bell System Technical Journal, vol. XLIV, Apr. 1965, No. 4, pp. 547–589.
C. S. H. Wong, J. C. Rudell, G. T. Uehara, and P. R. Gray, "A 50MHz Eight-Tap Adaptive Equalizer for Partial-Response Channels", IEEE Journal of Solid-State Circuits, vol. 30, No. 3, Mar. 1995, pp. 228–234.
S. Dasgupta and C. R. Johnson, Jr., "Some comments on the behavior of sing-sign adaptive identifiers", Systems & Control Letters, vol. 7, No. 2, Apr. 1986, pp. 75–82.

Primary Examiner—Stephen Chin
Assistant Examiner—Thuy L. Nguyen
Attorney, Agent, or Firm—Rennie William Dover

[57] ABSTRACT

An equalizer circuit (11) and a method for adjusting tap weights in the equalizer circuit (11) to provide an equalized signal. The equalizer circuit (11) includes an adaptation circuit (16) coupled to an FIR filter (17) and to an error sign generating circuit (18). The FIR filter (17) provides the signs of a plurality of delay signals to the tap weight adaptation circuit (16). Likewise, the error sign generating circuit (18) provides a sign of the error of an output signal of the FIR filter (17) to the tap weight adaptation circuit (16). The tap weight adaptation circuit (16) uses the signs of the delay signals and the sign of the error signal to generate the tap weights which are passed to the FIR filter (17) for adjusting the tap weights of the FIR filter (17).

19 Claims, 2 Drawing Sheets

EQUALIZER CIRCUIT AND A METHOD FOR EQUALIZING A CONTINUOUS SIGNAL

BACKGROUND OF THE INVENTION

The present invention relates, in general, to equalization of data signals, and more particularly, to adaptive equalization of data signals.

A common problem encountered when electronically transmitting data is that it becomes corrupted by such things as background noise, impulse noise, fades, etc. Usually this data corruption is a statistical phenomenon which causes additive and/or multiplicative transformations to the originally transmitted data. Thus, the original data undergoes changes such as frequency translation, nonlinear or harmonic distortion, and time dispersion. In addition, high speed data transmission over channels of limited bandwidth results in a type of distortion commonly referred to as intersymbol interference.

One technique for reducing intersymbol interference includes equalizing the data using an equalizer that compensates for the average of the range of expected channel amplitude and delay characteristics. Techniques for equalizing data are discussed in U.S. Pat. No. 5,243,624, entitled "METHOD AND APPARATUS FOR UPDATING COEFFICIENTS IN A COMPLEX ADAPTIVE EQUALIZER", which is issued to Paik et al., assigned to General Instrument Corporation, and is hereby incorporated herein by reference. As noted by Paik et al., prior art adaptive equalizers suffer from a relatively long convergence time for a least means square (LMS) algorithm. Another limitation of the prior art equalizers is that since they are implemented in digital circuitry, the data must be quantized prior to being processed by, for example, a finite impulse response (FIR) filter.

Further, it is difficult to use equalizer circuits in clock recovery applications because prior art FIR filters form a portion of the clock recovery path. Thus, the signal delay introduced by prior art FIR filters interferes with accurate recovery of timing information present in the equalized signal output.

Accordingly, it would be advantageous to have an equalizer circuit and a method for equalizing data without quantizing the data prior to filtering the data.

DETAILED DESCRIPTION OF THE DRAWINGS

Generally, the present invention provides an equalizer circuit and a method for equalizing a continuous time signal. The equalizer circuit is coupled to receive a continuous time data signal and comprises a finite impulse response (FIR) filter coupled to a weight generating circuit. The weight generating circuit includes circuitry for generating a sign of an error signal and circuitry for using the signs of the set of error signals and the signs of a set of delayed data signals to generate weighted output signals. The weighted output signals are fed back to the FIR filter as its tap weights, to adjust the continuous time output signal of the FIR filter. It should be understood that adjusting the continuous time output signal of the FIR filter is an iterative process which continues for a predetermined time or until the mean squared error of the output signal reaches a minimum.

More particularly, a continuous time data signal is received and compared with a reference signal such as, for example, a ground reference signal to generate a set of comparison signals, which indicate the signums, i.e., signs or polarities, of the continuous time data signal at various times. In addition, a continuous time output signal is generated and used to generate an error signal. The signs or polarities of the comparison signals and the sign or polarity of the error signal are determined and used to update the tap weights of the FIR filter. It should be noted that a modification of an LMS algorithm is used to update the tap weights of the equalizer circuit. As those skilled in the art are aware, LMS algorithms are used to update the tap weights of the FIR filter portion of the adaptive equalizer, wherein each coefficient of the LMS algorithm is updated using the equation:

$$C_{k+1} = C_k \beta * e_k * X_k$$

where $C_k$ is the tap vector at a time k * T;

$e_k$ is the difference between the filter output and the ideal output at time k * T, i.e., $e_k$ is the output error;

$x_k$ is a vector containing the FIR input signal value at the outputs of the individual delay elements; and $\beta$ is the step size which determines the speed of convergence.

However, in the present invention, a sign-sign LMS algorithm is used to update the tap weights of the FIR filter. The coefficients of the LMS algorithm are updated using the equation:

$$C_{k+1} = C_k + \beta * sgn(e_k) * sgn(x_k)$$

where sgn(.) is the signum function which is +1 or −1 for a positive or negative argument, respectively.

A discussion of LMS and sign-sign LMS algorithms is provided by Caesar S. H. Wong et al. in their paper entitled "A 50 MHz Eight-Tap Adaptive Equalizer for Partial-Response Channels" which was published in the "IEEE Journal of Solid-State Circuits," Vol. 30, No. 3, March 1995, and which is hereby incorporated herein by reference.

Figure 1:
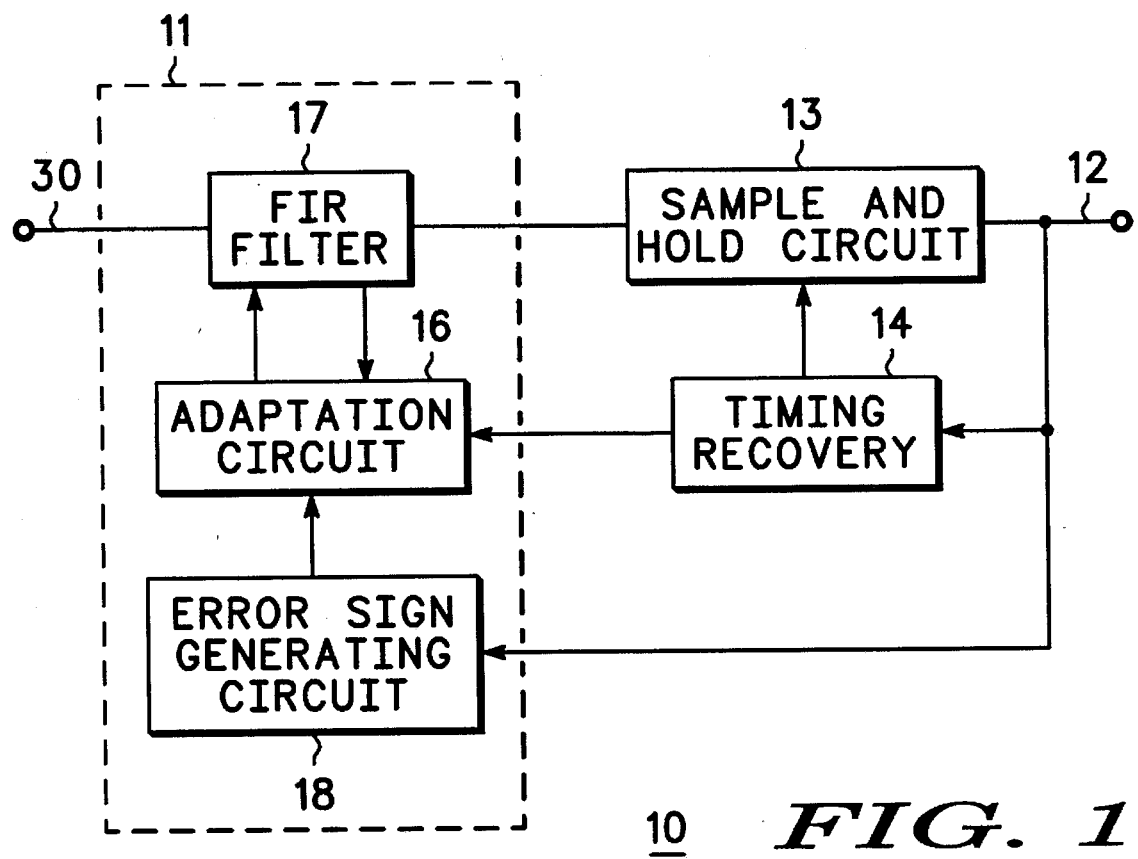
FIG. 1 illustrates a block diagram of an adaptively equalized non-coherent detection circuit which incorporates an equalizer circuit in accordance with an embodiment of the present invention.

FIG. 1 illustrates a block diagram of an adaptively equalized non-coherent detection circuit 10 having an analog equalizer circuit 11 coupled to an output node 12 via a sample and hold circuit 13. Detection circuit 10 includes a timing recovery circuit 14 which provides a sampling clock for enabling sample and hold circuit 13. In addition, timing recovery circuit 14 provides a timing alignment signal for equalizer circuit 11. In accordance with the present invention, equalizer circuit 11 has an input terminal 30 and comprises a tap weight adaptation circuit 16 coupled to an FIR filter 17 and to an error sign generating circuit 18. FIR filter 17 provides the signum or signs of a plurality of delay signals to tap weight adaptation circuit 16. Likewise, error sign generating circuit 18 provides a signum or sign of the error of an output signal of FIR filter 17 to tap weight adaptation circuit 16 and is, therefore also referred to as an error signum generating circuit. Then, tap weight adaptation circuit 16 uses the signs of the delay signals and the sign of the error signal to generate the tap weights or adaptation coefficients which are passed to FIR filter 17. Equalizer circuit 11 and its operation will be further discussed with reference to FIG. 2. It should be noted that sampling is performed at the output of FIR filter 17 rather than within or at its input, thereby preventing any delay associated with FIR filter 17 from interfering with timing recovery.

Figure 2:
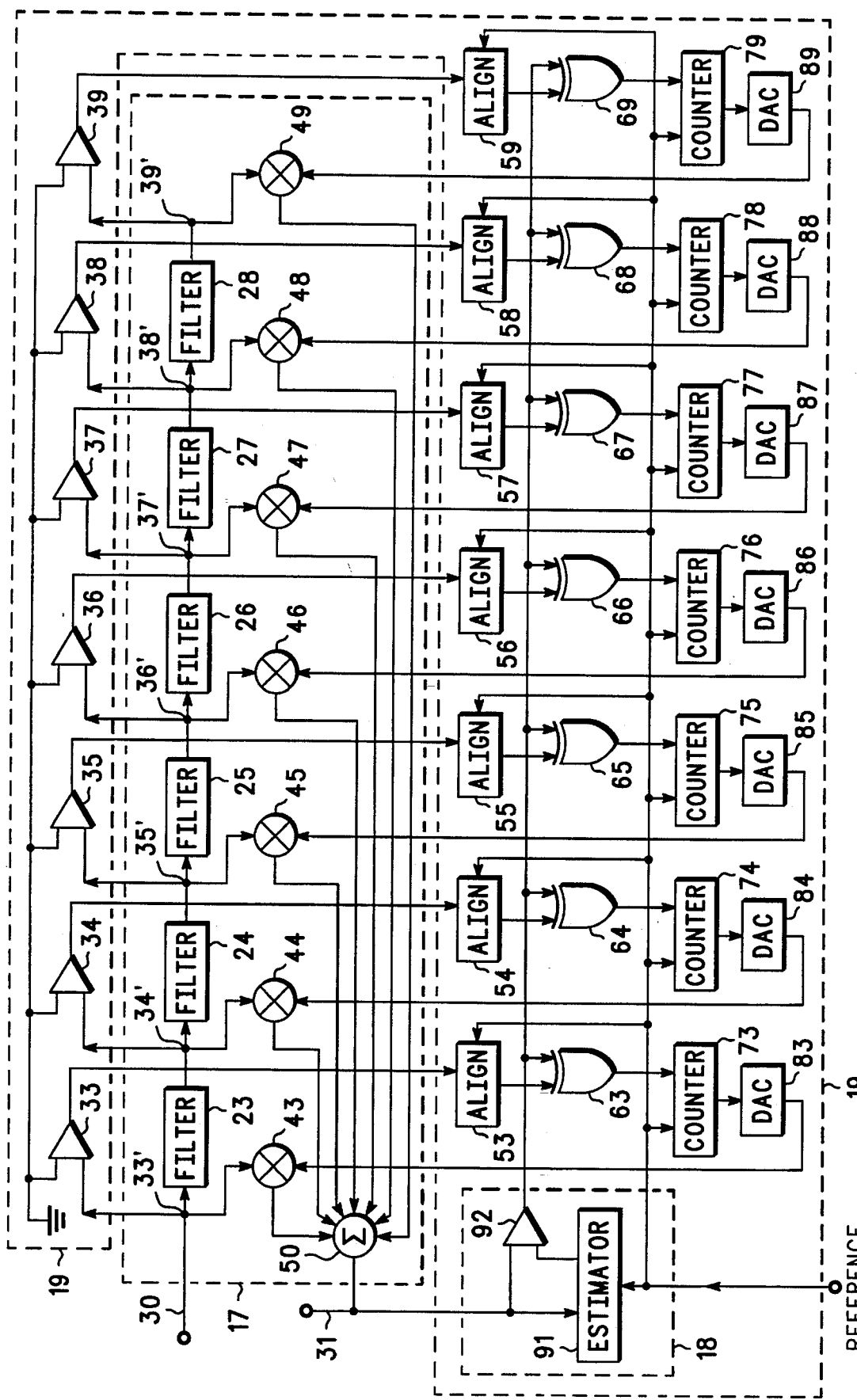
FIG. 2 illustrates a schematic diagram of the equalizer circuit of FIG. 1.

Referring now to FIG. 2, a schematic diagram of an analog adaptive equalizer circuit 11 comprised of and FIR filter 17 coupled to a weight generating circuit 19 is illustrated. Weight generating circuit 19 includes adaptation circuit 16 and error sign generating circuit 18 shown in FIG. 1 and is also referred to as a tap weight generation circuit. FIR filter 17, error sign generating circuit 18, and weight generating circuit 19 are each enclosed within dashed lines in FIG. 2. It should be understood that the same reference numerals are used in the figures to denote the same elements. By way of example, FIR filter 17 is a seven tap filter having six filter elements 23–28, seven comparators 33–39, seven multipliers 43–49, and a summing circuit 50. It should be noted that filter elements 23–28 are also referred to as filter circuits or delay elements, comparators 33–39 are also referred to as signum generating circuits, signum generators, or sign indicator circuits, and multipliers 43–49 are also referred to as multiplier circuits or tap weight multiplier circuits. Although each comparator and multiplier of circuit 11 has two input terminals and an output terminal, it should be understood that the number of input and output terminals for the comparators and multipliers is not a limitation of the present invention. It should be further understood that FIR filter 17 is shown as a seven tap filter as an example and is not intended as a limitation to the number of taps. Filter elements 23–28 are serially coupled such that an output terminal of filter element 23 is connected to an input terminal of filter element 24, an output terminal of filter element 24 is connected to an input terminal of filter element 25, an output terminal of filter element 25 is connected to an input terminal of filter element 26, an output terminal of filter element 26 is connected to an input terminal of filter element 27, and an output terminal of filter element 27 is connected to an input terminal of filter element 28. By way of example, filter elements 23–28 are fourth order equiripple filters having a flat group delay.

An input terminal 30 of filter element 23 is connected to a first input terminal of multiplier 43 and to a first input terminal of comparator 33. The node 33' common to input terminal 30 and the first input terminals of multiplier 43 and comparator 33 serves as a delay node having zero time delay. The output terminal of filter element 23 is connected to a first input terminal of multiplier 44 and to a first input terminal of comparator 34. The node 34' common to the output terminal of filter element 23 and the first input terminals of multiplier 44 and comparator 34 serves as a delay node having a first delay. Likewise, the output terminal of filter element 24 is connected to a first input terminal of multiplier 45 and to a first input terminal of comparator 35, wherein the node 35' common to the output terminal of filter element 24 and the first input terminals of multiplier 45 and comparator 35 serves as a delay node having a second delay; the output terminal of filter element 25 is connected to a first input terminal of multiplier 46 and to a first input terminal of comparator 36, wherein the node 36' common to the output terminal of filter element 25 and the first input terminals of multiplier 46 and comparator 36 serves as a delay node having a third delay; the output terminal of filter element 26 is connected to a first input terminal of multiplier 47 and to a first input terminal of comparator 37, wherein the node 37' common to the output terminal of filter element 26 and the first input terminals of multiplier 47 and comparator 37 serves as a delay node having a fourth delay; the output terminal of filter element 27 is connected to a first input terminal of multiplier 48 and to a first input terminal of comparator 38, wherein the node 38' common to the output terminal of filter element 27 and the first input terminals of multiplier 48 and comparator 38 serves as a delay node having a fifth delay; and the output terminal of filter element 28 is connected to a first input terminal of multiplier 49 and to a first input terminal of comparator 39, wherein the node 39' common to the output terminal of filter element 28 and the first input terminals of multiplier 49 and comparator 39 serves as a delay node having a sixth delay. Thus, FIR filter 17 includes a plurality of successive delay nodes. The second input terminals of comparators 33–39 are coupled to a common reference voltage level such as, for example, a ground potential.

The output terminals of multipliers 43–49 are connected to corresponding input terminals of summing circuit 50. It should be noted that summing circuits such as summing circuit 50 are well known to those skilled in the art. It should be further noted that output terminal 31 of summing circuit 50 serves as the output terminal for equalizer circuit 11.

For a seven tap equalizer circuit, weight generating circuit 19 includes seven signal alignment circuits 53–59, seven multipliers 63–69, seven up/down counters 73–79, seven digital-to-analog converters (DAC's) 83–89, an estimator circuit 91, and a comparator 92. Estimator circuit 91 and comparator 92 cooperate to form error sign generating circuit 18. It should be understood that the configuration of error sign generating circuit 18 is not a limitation of the present invention. For example, the sign of the error signal may be generated by comparing the output signal of the summing circuit with a reference signal such as ground. Signal alignment circuit 53 has an input terminal connected to the output terminal of comparator 33 and an output terminal connected to a first input terminal of an exclusive-OR circuit 63. An output terminal of exclusive-OR circuit 63 is connected to an input terminal of an up/down counter 73. Output terminals of up/down counter 73 are connected to corresponding input terminals of a DAC 83. The output terminal of DAC 83 is connected to a second input terminal of multiplier 43. Similarly, signal alignment circuit 54 has an input terminal connected to the output terminal of comparator 34 and an output terminal connected to a first input terminal of an exclusive-OR circuit 64. An output terminal of exclusive-OR circuit 64 is connected to an input terminal of an up/down counter 74. The output terminals of up/down counter 74 are connected to corresponding input terminals of a DAC 84. The output terminal of DAC 84 is connected to a second input terminal of multiplier 44, signal alignment circuit 55 has an input terminal connected to the output terminal of comparator 35 and an output terminal connected to a first input terminal of an exclusive-OR circuit 65. An output terminal of exclusive-OR circuit 65 is connected to an input terminal of an up/down counter 75 and the output terminals of up/down counter 75 are connected to corresponding input terminals of a DAC 85. The output terminal of DAC 85 is connected to a second input terminal of multiplier 45. Signal alignment circuit 56 has an input terminal connected to the output terminal of comparator 36 and an output terminal connected to a first input terminal of an exclusive-OR circuit 66. An output terminal of exclusive-OR circuit 66 is connected to an input terminal of an up/down counter 76 and the output terminals of up/down counter 76 are connected to corresponding input terminals of a DAC 86. The output terminal of DAC 86 is connected to a second input terminal of multiplier 46. Signal alignment circuit 57 has an input terminal connected to the output terminal of comparator 37 and an output terminal connected to a first input terminal of an exclusive-OR circuit 67. An output terminal of exclusive-OR circuit 67 is connected to an input terminal of an up/down counter 77 and the output terminals of up/down counter 77 are connected to corresponding input terminals of a DAC 87. The output terminal of DAC 87 is connected to a second input terminal of multiplier 47. Signal alignment circuit 58 has an input terminal connected to the output terminal of comparator 38 and an output terminal connected to a first input terminal of an exclusive-OR circuit 68. An output terminal of exclusive-OR circuit 68 is connected to an input terminal of an up/down counter 78 and the output terminals of up/down counter 78 are connected to an input terminal of a DAC 88. The output terminal of DAC 88 is connected to a second input terminal of multiplier 48. Signal alignment circuit 59 has an input terminal connected to the output terminal of comparator 39 and an output terminal connected to a first input terminal of an exclusive-OR circuit 69. An output terminal of exclusive-OR circuit 69 is connected to an input terminal of an up/down counter 79. The output terminals of up/down counter 79 are connected to corresponding input terminals of a DAC 89. The output terminal of DAC 89 is connected to a second input terminal of multiplier 49. It should be noted that counters 73–79 are presettable counters that are initialized to a predetermined value that is defined by the user. Although counters 73–79 are described as up/down counters, it should be understood that this is not a limitation of the present invention.

Weight generating circuit 19 further includes an estimator circuit 91 having a first input terminal connected to output terminal 31 of summing circuit 50, a second input terminal connected to a reference clock signal, and an output terminal connected to a first input terminal of a comparator circuit 92. A second input terminal of comparator circuit 92 is coupled to output terminal 31 of summing circuit 50. The output terminal of comparator 92 is coupled to the second input terminals of exclusive-OR circuits 63–69. Estimator circuit 91 provides a target output value or estimate of the continuous input signal for comparing with the actual output signal of FIR filter 17. It should be noted that the reference clock is connected to each of signal align circuits 53–59 and to each of up/down counters 73–79.

In operation, input terminal 30 is coupled to receive a continuous input signal X(n). Although continuous time signals are represented by functions using the letter "t" as the argument, it should be noted that the letter "n" is used for the argument of the continuous time input signal to indicate that processing occurs at discrete time intervals. The continuous time input signal X(n) is passed or transmitted through a plurality of serially connected filter elements 23–28 which serve as delay stages. The input signals received by filter elements 23–28 are supplied to the respective first input terminals of corresponding multipliers 43–48 and to the corresponding first input terminals of the respective comparators 33–38. Likewise, the output signal of filter element 28 is transmitted to the first input terminal of a multiplier 49 and to the first input terminal of a comparator 39. Thus, input signal X(n) is transmitted to the first input terminal of comparator 33 and to the first input terminal of multiplier 43. Similarly, a delayed input signal X(n-1) is transmitted to the first input terminal of comparator 34 and to the first input terminal of multiplier 44; a delayed input signal X(n-2) is transmitted to the first input terminal of comparator 35 and to the first input terminal of multiplier 45; a delayed input signal X(n-3) is transmitted to the first input terminal of comparator 36 and to the first input terminal of multiplier 46; a delayed input signal X(n-4) is transmitted to the first input terminal of comparator 37 and to the first input terminal of multiplier 47; a delayed input signal X(n-5) is transmitted to the first input terminal of comparator 38 and to the first input terminal of multiplier 48; and a delayed input signal X(n-6) is transmitted to the first input terminal of comparator 39 and to the first input terminal of multiplier 49. Thus, a set of delayed signal data is generated.

A sign of input signal X(n) relative to the reference signal is generated by comparing input signal X(n) to a reference signal. For example, comparator 33 compares input signal X(n) at its first input terminal to the reference signal at its second terminal, e.g., ground potential, and generates an output signal sgn(X(n)) which indicates whether X(n) was greater than or less than the reference signal. Output signal sgn(X(n)) serves as a signum or sign of the signal data X(n) having zero delay. Output signal sgn(X(n)) is supplied to the first input terminal of exclusive-OR circuit 63 via signal alignment circuit 53. Comparator 34 compares input signal X(n-1) at its first input terminal to the reference signal at its second input terminal and generates an output signal sgn(X(n-1)), which indicates whether input signal X(n-1) is greater than or less than the reference signal. Output signal sgn(X(n-1)) serves as a delayed signum or sign of the delayed signal data X(n-1). Output signal sgn(X(n-1)) is supplied to the first input terminal of exclusive-OR circuit 64 via signal alignment circuit 54. Comparator 35 compares input signal X(n-2) at its first input terminal to the reference signal at its second input terminal and generates an output signal sgn(X(n-2)), which indicates whether input signal X(n-2) is greater than or less than the reference signal. Output signal sgn(X(n-2)) serves as a delayed signum or sign of the delayed signal data X(n-2). Output signal sgn(X(n-2)) is supplied to the first input terminal of exclusive-OR circuit 65 via signal alignment circuit 55. Comparator 36 compares input signal X(n-3) at its first input terminal to the reference signal at its second input terminal and generates an output signal sgn(X(n-3)), which indicates whether input signal X(n-3) is greater than or less than the reference signal. Output signal sgn(X(n-3)) serves as a delayed signum or sign of the delayed signal data X(n-3). Output signal sgn(X(n-3)) is supplied to the first input terminal of exclusive-OR circuit 66 via signal alignment circuit 56. Comparator 37 compares input signal X(n-4) at its first input terminal to the reference signal at its second input terminal and generates an output signal sgn(X(n-4)), which indicates whether input signal X(n-4) is greater than or less than the reference signal. Output signal sgn(X(n-4)) serves as a delayed signum or sign of the delayed signal data X(n-4). Output signal sgn(X(n-4)) is supplied to the first input terminal of exclusive-OR circuit 67 via signal alignment circuit 57. Comparator 38 compares input signal X(n-5) at its first input terminal to the reference signal at its second input terminal and generates an output signal sgn(X(n-5)), which indicates whether input signal X(n-5) is greater than or less than the reference signal. Output signal sgn(X(n-5)) serves as a delayed signum or sign of the delayed signal data X(n-5). Output signal sgn(X(n-5)) is supplied to the first input terminal of exclusive-OR circuit 68 via signal alignment circuit 58. Comparator 39 compares input signal X(n-6) at its first input terminal to the reference signal at its second input terminal and generates an output signal sgn(X(n-6)), which indicates whether input signal X(n-6) is greater than or less than the reference signal. Output signal sgn(X(n-6)) serves as a delayed signum or sign of the delayed signal data X(n-6). Output signal sgn(X(n-6)) is supplied to the first input terminal of exclusive-OR circuit 69 via signal alignment circuit 59.

The second input terminal of each exclusive-OR circuit 63–69 receives the sign of an error signal which is generated using estimator circuit 91. More particularly, estimator circuit 91 samples the output signal of summing circuit 50, i.e., samples the data signal and provides an estimate of the error between an estimated target value and an actual value of the output signal, i.e., an error signal. Comparator 92 compares the output signal from estimator circuit 91 to the output signal from summing circuit 50 and generates an output signal that indicates the sign of the error signal. In other words, if the value of the output signal of estimator circuit 91, i.e., the error signal, is less than the value of the output signal of summing circuit 50, the output value of comparator 92 is a logic low, indicating a negative sign for the error signal. If the error signal is greater than the value of the output signal from summing circuit 50, the output value of comparator 92 is a logic high, indicating a positive sign for the error signal. Thus, the sign of the error is supplied to each of the second input terminals of exclusive-OR circuits 63–69. It should be understood that exclusive-OR circuits are conveniently used to perform signed multiplication and, therefore, are also referred to as error signum multiplier circuits, error sign multiplier circuits, or multiplier circuits.

Exclusive-OR circuit 63 multiplies the sign of the error with the value of sgn(X(n)), i.e., the sign of the signal X(n). Likewise, exclusive-OR circuit 64 multiplies the sign of the error with the value of sgn(X(n-1)), i.e., the sign of the signal X(n-1); exclusive-OR circuit 65 multiplies the sign of the error with the value of sgn(X(n-2)), i.e., the sign of the signal X(n-2); exclusive-OR circuit 66 multiplies the sign of the error with the value of sgn(X(n-3)), i.e., the sign of the signal X(n-3); exclusive-OR circuit 67 multiplies the sign of the error with the value of sgn(X(n-4)), i.e., the sign of the signal X(n-4); exclusive-OR circuit 68 multiplies the sign of the error with the value of sgn(X(n-5)), i.e., the sign of the signal X(n-5); and exclusive-OR circuit 69 multiplies the sign of the error with the value of sgn(X(n-6)), i.e., the sign of the signal X(n-6). It should be noted that signal alignment circuits 53–59 serve to time align the sign of the signals, i.e., sgn(X(n)), sgn(X(n-1)), sgn(X(n-2)), sgn(X(n-3)), sgn(X(n-4)), sgn(X(n-5)), and sgn(X(n-6)) with the correct sign of the error signal. In other words, signal alignment circuits 53–59 ensure that the sign of the error signal corresponds to the signs of the delayed signal set at the time the error sign was formed. The products resulting from each multiplication are used to increment or decrement the respective counters 73–79. The output values of counters 73–79 are converted from a digital form to an analog form via the respective DAC's 83–89. The output values of DAC's 83–89 are supplied to the respective second input terminals of multipliers 43–49 and serve as weighted signals or tap weights for adjusting the taps of FIR filter 17. The first set of polarities of the first set of delayed continuous time input data are multiplied by the first polarity of the first error signal to form an adapted set of tap weights.

The process is an iterative process that is continued until the equalizer output signal attains the appropriate sampled output values. By way of example, when using class IV signaling, the sampled output signal taken from output terminal 31 should converge to the target values of +1, 0, and −1. It should be understood that the type of signaling is not a limitation of the present invention.

Although the embodiment of FIG. 1 has been shown as receiving a single ended input signal, it should be understood that this is not a limitation of the present invention. In other words, the circuits of FIG. 1 may be configured differentially. Further, the number of taps is not a limitation of the present invention.

By now it should be appreciated that a circuit and a method for adaptively equalizing a data signal have been provided. In accordance with the present invention, a sign-sign LMS algorithm has been used to update the tap weights of a continuous time FIR filter, wherein the tap weights are adjusted at discrete time steps aligned with a sampler clock. Further, sampling is performed at the output of the FIR filter rather than within or at its input, thereby preventing any delay associated with the FIR filter from interfering with timing recovery.

We claim:

1. An equalizer circuit having a continuous time output signal, comprising:

a finite impulse response filter having a plurality of successive delay nodes coupled for providing a set of delayed signal data and a set of delayed signs of the corresponding set of delayed signal data from a continuous time input signal and having a plurality of multiplier circuits coupled for multiplying the set of delayed signal data with a corresponding set of tap weights, wherein the plurality of successive delay nodes includes a filter circuit having an input terminal and an output terminal and a signum generating circuit having a plurality of input terminals and an output terminal, and each multiplier circuit of the plurality of multiplier circuits has a plurality of input terminals and an output terminal, the input terminal of the filter circuit coupled to a first input terminal of the signum generating circuit and to a first input terminal of a first multiplier circuit of the plurality of multiplier circuits, a second input terminal of the signum generating circuit coupled to receive a reference signal, and the output terminal of the signum generating circuit coupled to the tap weight generation circuit; and a tap weight generation circuit coupled for providing the set of tap weights.

2. An equalizer circuit having a continuous time output signal as claimed in claim 1, wherein the signum generating circuit comprises a comparator circuit.

3. An equalizer circuit having a continuous time output signal as claimed in claim 1, wherein the reference signal is a ground potential.

4. An equalizer circuit having a continuous time output signal, comprising:

a finite impulse response filter having a plurality of successive delay nodes coupled for providing a set of delayed signal data and a set of delayed signs of the corresponding set of delayed signal data from a continuous time input signal and having a plurality of multiplier circuits coupled for multiplying the set of delayed signal data with a corresponding set of tap weights: and a tap weight generation circuit coupled for providing the set of tap weights, wherein the tap weight generation circuit includes an estimator circuit coupled for providing an estimate of a desired output signal, an error signum generating circuit coupled for providing a sign of an error signal, and a plurality of error signum multiplier circuits coupled to corresponding multiplier circuits of the plurality of multiplier circuits.

5. An equalizer circuit having a continuous time output signal as claimed in claim 4, wherein the plurality of error signum multiplier circuits comprises exclusive-OR circuits.

6. An equalizer circuit for generating a continuous time output signal, comprising:

a continuous time, adaptive, finite impulse response filter which comprises a plurality of serially coupled delay nodes, a plurality of sign indicator circuits, each sign indicator circuit of the plurality of sign indicator circuits having an input terminal and an output terminal, the input terminals of each sign indicator circuit of the plurality of sign indicator circuits coupled to a corresponding delay node of the plurality of delay nodes, a plurality of tap weight multiplier circuits, each tap weight multiplier circuit of the plurality of tap weight multiplier circuits having a plurality of input terminals and an output terminal, wherein a first input terminal of each tap weight multiplier circuit of the plurality of tap weight multiplier circuits is coupled to a corresponding delay node of the plurality of serially coupled delay nodes, a summing circuit having a plurality of input terminals and an output terminal, a first input terminal of the summing circuit coupled to the output terminal of each tap weight multiplier circuit of the plurality of tap weight multiplier circuits; and a weight generating circuit having a plurality of input terminals and a plurality of output terminals, each of the plurality of input terminals of the weight generating circuit coupled to a corresponding sign indicator circuit of the plurality of sign indicator circuits and each of the plurality of output terminals of the weight generating circuit coupled to a second input terminal of a corresponding tap weight multiplier circuits of the plurality of tap weight multiplier circuits.

7. An equalizer circuit for generating a continuous time output signal as claimed in claim 6, wherein the plurality of serially coupled delay nodes are serially coupled via filter elements.

8. An equalizer circuit for generating a continuous time output signal as claimed in claim 7, wherein the filter elements are fourth order equiripple filter elements.

9. An equalizer circuit for generating a continuous time output signal as claimed in claim 6, wherein the plurality of serially coupled delay nodes comprises seven delay nodes, the plurality of sign indicator circuits comprises seven sign indicator circuits, and the plurality of tap weight multiplier circuits comprises seven tap weight multiplier circuits.

10. An equalizer circuit for generating a continuous time output signal as claimed in claim 6, wherein the plurality of delay nodes comprises seven delay nodes, the plurality of sign indicator circuits comprises seven sign indicator circuits, and the plurality of tap weight multiplier circuits comprises seven tap weight multiplier circuits.

11. An equalizer circuit for generating a continuous time output signal as claimed in claim 6, wherein the weight generating circuit comprises an error sign multiplier circuit coupled to the summing circuit via an error sign generating circuit.

12. An equalizer circuit for generating a continuous time output signal as claimed in claim 11, wherein the error sign multiplier circuit comprises an exclusive-OR circuit.

13. An equalizer circuit for generating a continuous time output signal as claimed in claim 11, wherein the error sign generation circuit comprises an estimator circuit coupled for providing a target output value for comparing with an actual output value of the continuous time, adaptive, finite impulse response filter.

14. An equalizer circuit for generating a continuous time output signal, comprising:

a continuous time, adaptive, finite impulse response filter which comprises:

a delay element having an input terminal and an output terminal, the input terminal coupled for receiving an input signal;

a signum generator having an input terminal and an output terminal, the input terminal of the signum generator coupled to the input terminal of the delay element;

a first multiplier circuit having a plurality of input terminals and an output terminal, a first input terminal of the plurality of input terminals coupled to the input terminal of the delay element;

a second multiplier circuit having a plurality of input terminals and an output terminal, a first input terminal of the plurality of input terminals coupled to the output terminal of the delay element; and a summing circuit having a plurality of input terminals and an output terminal, a first input terminal of the summing circuit coupled to the output terminal of the first multiplier circuit and a second input terminal of the summing circuit coupled to the output terminal of the second multiplier circuit; and a weight generating circuit having a plurality of input terminals and a plurality of output terminals, a first input terminal of the weight generating circuit coupled to the output terminal of the signum generator and a second input terminal of the weight generating circuit coupled to the output terminal of the summing circuit, a first output terminal of the weight generating circuit coupled to a second input terminal of the plurality of input terminals of the first multiplier circuit and a second output terminal of the weight generating circuit coupled to a second input terminal of the plurality of input-terminals of the second multiplier circuit.

15. An equalizer circuit for generating a continuous time output signal as claimed in claim 14, wherein the weight generating circuit comprises an estimator circuit coupled for multiplying a sign of an error signal with a corresponding sign of the input signal.

16. An equalizer circuit for generating a continuous time output signal as claimed in claim 14, wherein the signum generator comprises a comparator coupled for providing sign of the input signal.

17. An equalizer circuit for generating a continuous time output signal as claimed in claim 16 wherein the delay element is a filter.

18. A method for adapting coefficients in a continuous time adaptive equalizer, comprising the steps of:

transmitting a first portion of a continuous time input data signal through a plurality of serially coupled delay stages to provide a first set of delayed continuous time input data;

generating a first set of polarities of the first set of delayed continuous time input data;

generating a first error signal;

generating a first polarity of the first error signal; and multiplying the first set of polarities of the first set of delayed continuous time input data by the first polarity of the first error signal to form an adapted set of tap weights.

19. A method for adapting coefficients as claimed in claim 18, further including the steps of:

transmitting a second portion of a continuous time input data signal through the plurality of serially coupled delay stages to provide a second set of delayed continuous time input data;

generating a second set of polarities of the first set of delayed continuous time input data;

generating a second error signal;

generating a second polarity of the second error signal; and multiplying the second set of polarities of the second set of delayed continuous time input data by the second polarity of the second error signal to form another adapted set of tap weights.

* * * * *